United States Patent
Enjoji et al.

(10) Patent No.: US 7,178,374 B2
(45) Date of Patent: Feb. 20, 2007

(54) PRESS FORMING APPARATUS FOR FUEL CELL METAL SEPARATOR

(75) Inventors: Naoyuki Enjoji, Wako (JP); Toshiki Kawamura, Wako (JP); Hideaki Kikuchi, Wako (JP); Takanori Monda, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 11/001,877

(22) Filed: Dec. 2, 2004

(65) Prior Publication Data
US 2005/0188740 A1 Sep. 1, 2005

(30) Foreign Application Priority Data
Dec. 3, 2003 (JP) ............................. 2003-404080

(51) Int. Cl.
*B21D 13/02* (2006.01)
(52) U.S. Cl. ............................. 72/312; 72/385; 72/414; 72/379.2
(58) Field of Classification Search .................. 72/385, 72/404, 414, 312, 379.2
See application file for complete search history.

(56) References Cited

U.S. PATENT DOCUMENTS

| | | | | |
|---|---|---|---|---|
| 1,431,175 A | * | 10/1922 | Ogden et al. | 72/336 |
| 2,948,325 A | * | 8/1960 | Welindt | 72/313 |
| 3,748,889 A | * | 7/1973 | Miller et al. | 72/382 |
| 6,772,617 B1 | * | 8/2004 | Allen | 72/302 |
| 2004/0079128 A1 | * | 4/2004 | Kusunoki et al. | 72/57 |

FOREIGN PATENT DOCUMENTS

| | | |
|---|---|---|
| JP | 2000-317531 | 11/2000 |
| JP | 2001-71042 | * 3/2001 |
| JP | 2002-75401 | 3/2002 |
| JP | 2003-36867 | 2/2003 |
| JP | 2003-77486 | 3/2003 |
| JP | 2003-142119 | 5/2003 |

* cited by examiner

*Primary Examiner*—Daniel C. Crane
(74) *Attorney, Agent, or Firm*—Fish & Richardson P.C.

(57) ABSTRACT

A press forming apparatus, for metal separators for fuel cells, has a pair of peripheral portion holding dies which hold a peripheral portion of a material and are movable toward and counter to each other; a pair of intermediate portion forming dies for forming a intermediate portion of the material, which are disposed inside the peripheral portion holding dies and are movable toward and counter to each other; and a pair of center portion forming dies for forming a center portion of the material, which are disposed inside the intermediate portion forming dies and are movable toward and counter to each other, wherein one of the peripheral portion holding dies and one of the intermediate portion forming dies are fixed to each other, one of the center portion forming dies is movable with respect to one of the intermediate portion forming dies toward the material, the other intermediate portion forming die and the other center portion forming die are fixed to each other, and the other intermediate portion forming die is movable with respect to the other peripheral portion holding die.

3 Claims, 5 Drawing Sheets

PRESS FORMING APPARATUS FOR FUEL CELL METAL SEPARATOR

BACKGROUND OF THE INVENTION

1. Field of the Invention

The present invention relates to a press forming apparatus and to a press forming method for producing metal separators for fuel cells. In particular, the present invention relates to a press forming technique for producing metal separators for high precision solid polymer electrolyte fuel cells, which facilitates setting a solid polymer electrolyte fuel cell metal separator in a die when a seal is integrally formed with the metal separator, and which yields a good sealing characteristics between separators when separators are stacked in a stack.

2. Description of the Related Art

In solid polymer electrolyte fuel cells, a separator is applied to both sides of a plate-shaped electrode (MEA: Membrane Electrode Assembly) to form a unit having a layered structure, and plural units are stacked to form a fuel cell stack. The MEA is a three-layered structure in which a polymerized electrolytic membrane, which is made of a resin such as an ion-exchange resin, is held by a pair of gas diffusion electrode plates (positive electrode plate (cathode) and negative electrode plate (anode)). The separator is layered so as to contact the gas diffusion electrode plate of the MEA, and gas passages and coolant passages where gas is circulated between the gas diffusion electrode plate and the separator are formed. According to the fuel cell, hydrogen gas as a fuel is provided to the gas passages facing the gas diffusion electrode plate at the negative electrode plate side, and an oxidizing gas such as oxygen or air is provided to the gas passages facing the gas diffusion electrode plate at the positive electrode plate side, and electricity is thereby generated by an electrochemical reaction.

In general, a metal separator used for the above fuel cell is produced by performing press forming, a piercing process, and a trimming process, in that order. The press forming in the above determines a separator structure, and various techniques have been proposed in the past.

A method as the separator forming technique was proposed (see Japanese Unexamined Patent Application Publication No. 2003-142119), in which a polymer film is disposed between a press forming die and a separator material plate in producing a metal separator for fuel cells which has conductive inclusions in a metallographic structure thereof. A method was proposed (see Japanese Unexamined Patent Application Publication No. 2003-77486), in which a base material is formed by press forming, and is subjected to TRD process (Thermo-Reactive Deposition and Diffusion Process), followed by strain elimination process. A method was proposed (see Japanese Unexamined Patent Application Publication No. 2002-75401), in which press forming is performed by using a die having a shape similar to an external shape of a separator for solid polymer electrolyte fuel cells. The separator has a flat portion at each intermediate portion of a protrusion portion and a recess portion, and has a bend portion having a predetermined curvature at each shoulder portion. A method was proposed (see Japanese Unexamined Patent Application Publication No. 2003-36867), in which a separator material made of synthetic resin having an appropriate cross section as a separator is prepared by injection molding synthetic resin, extrusion forming, or press forming. Then, the entire surface of the separator material is subjected to electroless metal plating. A method having the following steps in a press working method in which plural projections are formed on a plate allowing plastic deformation by pressing was proposed (see Japanese Unexamined Patent Application Publication No. 2000-317531). That is, the method has a first step of forming an overhang portion at a portion for forming a desired projection with a first pressing die, and a second step of completing a projection by extruding a center portion with a second pressing die, which is adjacent to a center of the overhang portion, from a circumferential portion of the overhang portion.

Figure 1A:
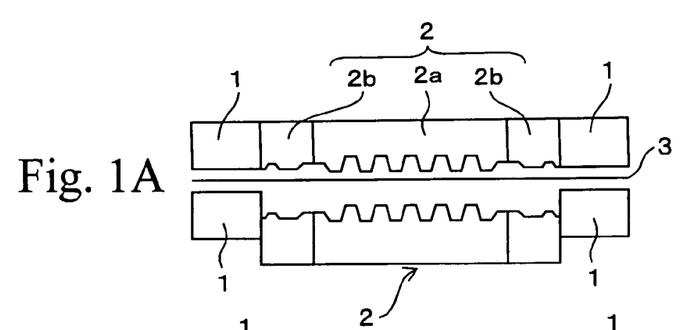
FIGS. 1A to 1D are side views showing in time series a die and a separator material used in a conventional press forming method.
Figure 1B:
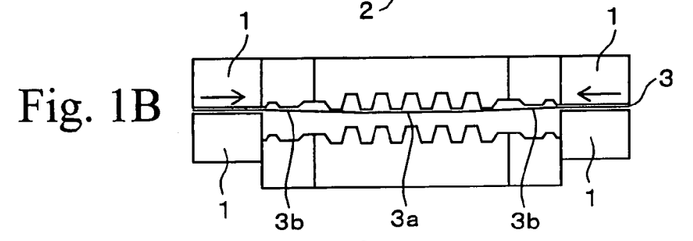
Figure 1C:
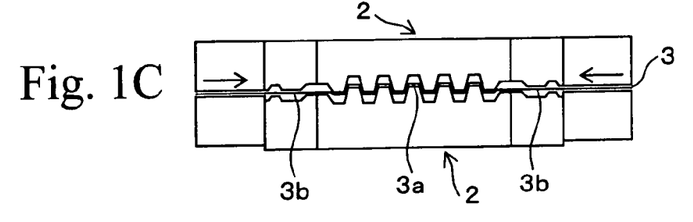
Figure 1D:
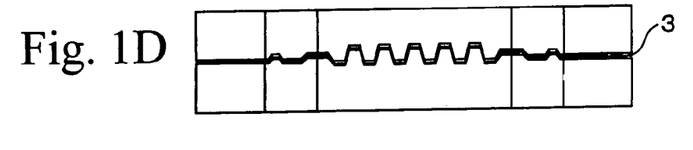
Figure 1E:
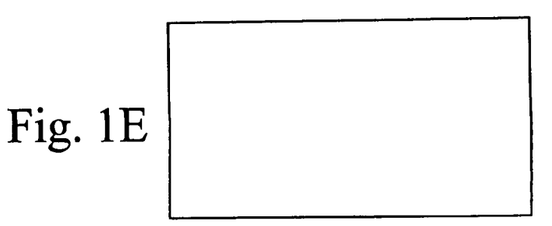
FIGS. 1E to 1H are plane views showing conditions of the separator materials corresponding to FIGS. 1A to 1D.
Figure 1F:
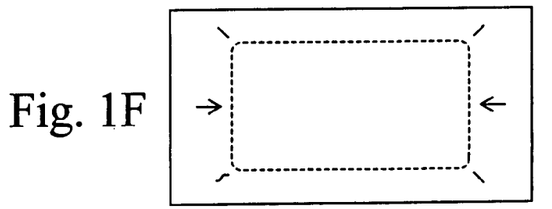
Figure 1G:
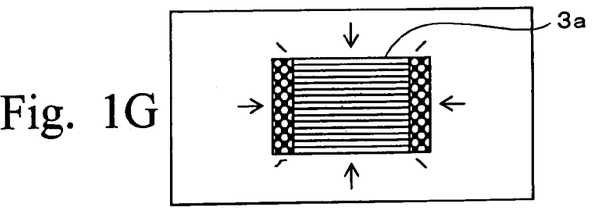
Figure 1H:
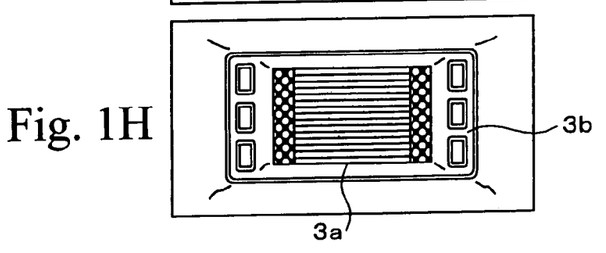

FIGS. 1A to 1D are side views showing in time series a die and a separator material used in methods of conventional press forming processes. FIGS. 1E to 1H are plane views showing conditions of the separator materials corresponding to FIGS. 1A to 1D. In FIGS. 1B, 1C, 1F, and 1G each arrow denotes a direction of stress in the separator material. In FIGS. 1F, 1G, and 1H, each short line denotes a crease generated on the separator material. In the conventional techniques, as shown in FIGS. 1A to 1D, a die having upper and lower peripheral portion holding dies 1 and upper and lower forming dies 2 disposed inside the peripheral portion holding die 1 is used. The upper peripheral portion holding die 1 and the upper forming die 2 are fixed with each other. The lower forming die 2 is slidably movable with respect to the lower peripheral portion holding die 1. The forming die 2 has a buffer and passage groove forming portion 2a, and a hole forming portion 2b which is disposed outside the passage groove forming portion 2a. The buffer and passage groove forming portion 2a has a relatively large number of machined portions, and the hole forming portion 2b has a relatively few machined portions. In the above die, a separator material 3 is provided as shown in FIG. 1A, and is held by the upper and the lower peripheral portion holding dies 1 as shown in FIG. 1B. Then, the separator material 3 is subjected to press forming by moving the lower forming die 2 after that as shown in FIGS. 1C and 1D.

In the case in which the above forming apparatus is used, as shown in FIGS. 1B and 1F, when the peripheral portion of the separator material 3 is held by the peripheral portion holding dies 1, the center portion of the separator material of which a buffer and passage groove portion 3a is formed swells downward with respect to the outer portion thereof, which is a hole forming portion 3b, and pulling thereby occurs in the separator material 3 due to stress in a direction shown by the arrow. Next, as shown FIGS. 1C and 1G; the lower forming die 2 is moved upward. In this case, since the buffer and passage groove portion 3a at a center portion of the separator material 3 is worked more than the buffer and passage groove portion 3a positioned thereroutside, the buffer and passage groove portion 3a is first worked by press forming, so that pulling is further generated. As a result, as shown in FIGS. 1D and 1H, when press forming is completed, working strain is formed at several portions of the separator. As a result, creases and warps are formed, the circumference of the separator material is excessively elongated, and groove depth is shallow. Due to this, after a subsequent trimming process is performed, creases, etc., are maintained as they are, and good size accuracy is not thereby obtained at each portion of the separator. Therefore, when a seal is integrally formed with the separator, setting of the separator in a die is difficult. When separators are stacked in a stack, good sealing characteristics between separators cannot be obtained.

SUMMARY OF THE INVENTION

Therefore, the present invention was made in consideration of the above problems, and an object of the present invention is to provide a press forming apparatus and a press forming method for metal separators for fuel cells, which facilitates setting a solid polymer electrolyte fuel cell metal separator in a die when a seal is integrally formed with the metal separator, and which can yields good sealing characteristics between separators when separators are stacked in a stack.

The present invention provides a press forming apparatus for metal separators for fuel cells, the press forming apparatus including: a pair of peripheral portion holding dies which hold a peripheral portion of a material and are movable toward and counter to each other; a pair of intermediate portion forming dies for forming a intermediate portion of the material, which are disposed inside the peripheral portion holding dies and are movable toward and counter to each other; and a pair of center portion forming dies for forming a center portion of the material, which are disposed inside the intermediate portion forming dies and are movable toward and counter to each other, wherein one of the peripheral portion holding dies and one of the intermediate portion forming dies are fixed to each other, one of the center portion forming dies is movable with respect to one of the intermediate portion forming dies toward the material, the other intermediate portion forming die and the other center portion forming die are fixed to each other, and the other intermediate portion forming die is movable with respect to the other peripheral portion holding die.

The present invention provides another press forming apparatus for metal separators for fuel cells, the press forming apparatus including: a pair of peripheral portion holding dies which hold a peripheral portion of a material and are movable toward and counter to each other; a pair of intermediate portion forming dies for forming a intermediate portion of the material, which are disposed inside the peripheral portion holding dies and are movable toward and counter to each other; and a pair of center portion forming dies for forming a center portion of the material, which are disposed inside the intermediate portion forming dies and are movable toward and counter to each other, wherein one of the peripheral portion holding dies and one of the intermediate portion forming dies are fixed to each other, one of the center portion forming dies is movable with respect to one of the intermediate portion forming dies toward the material, the other intermediate portion forming die is movable with respect to the other peripheral portion holding die toward the material, and the other center portion forming die is movable with respect to the other intermediate portion forming die.

The present invention provides a press forming method for metal separators for fuel cells having a hole portion disposed at a periphery of the separator, a buffer portion disposed inside the hole portion, a passage groove portion disposed inside the buffer portion; the press forming method including steps of: forming the hole portion by a pair of intermediate portion forming dies movable toward and counter to each other; forming the buffer portion and the passage by a pair of center portion forming dies movable toward and counter to each other while holding the hole portion by the intermediate portion forming dies after forming the hole portion.

In the above press forming method, the passage portion may desirably have a serpentine shape having at least one folded portion in a plane.

In the press forming apparatus for separators for fuel cells, forming die 2 shown in FIG. 1A is divided into a die (center portion forming die) for forming a buffer portion and a passage groove portion which have a relatively large number of machined portions and a die (intermediate portion forming die) for forming a relatively few machined portions, and at least one of the center portion forming dies is movable with respect to one of the intermediate portion forming dies toward the material, whereby when a peripheral portion of a separator material is held by the peripheral portion holding dies, a center portion having a buffer portion and passage groove portion of a separator does not swell downward, and pulling of the separator material generated in the conventional technique does not occur. In the above structure of the press forming apparatus, in press forming, the center portion forming die for forming a buffer portion and passage groove portion which has a relatively large number of machined portions can be operated to be delayed with respect to the intermediate portion forming die for forming a hole portion which has a relatively few machined portions. Due to this, the buffer portion and passage groove portion as a center portion of the separator material is not subjected to press forming previously than the hole portion disposed thereoutside, and the above pulling can be further prevented. As a result, in the case in which the press forming apparatus for separators for fuel cells of the present invention is used, when press forming is completed, working strain is not formed at several portions of the separator material, formation of creases and warps can thereby be prevented, the circumference of the separator material is not excessively elongated, and groove depth can be further set at a predetermined size. Therefore, when a subsequent trimming process is performed, creases, etc., are not formed in the separator, and good size accuracy can be obtained at several portions of the separator. In particular, in a case in which the other center portion forming die is movable with respect to the other intermediate portion forming die, when the hole portion is subjected to press forming, the upper and lower center portion forming dies can be separated from the separator material, and swelling of the center portion of the separator material can thereby be prevented. For the above reasons, according to the present invention, it is easy to set the separator in a die while integrally forming a seal with the separator, and good sealing characteristics between separators can be obtained when separators are stacked in a stack.

According to the press forming method for metal separators for fuel cells of the present invention, a hole portion having a relatively few machined portions is first subjected to press forming, a buffer portion and passage groove portion having a relatively large number of worked portions is subjected to press forming while the hole portion is held by the dies, whereby formation of working strain can be prevented at several portions of the separator. In the above press forming method for metal separators for fuel cells, the passage portion may desirably have a serpentine shape having at least one folded portion in a plane, whereby oxygen, hydrogen, and water can be circulated well from one side to the other side of the separator.

DESCRIPTION OF THE PREFERRED EMBODIMENTS

A preferred embodiment of the present invention will be described hereinafter with reference to the Figures.

Figure 2A:
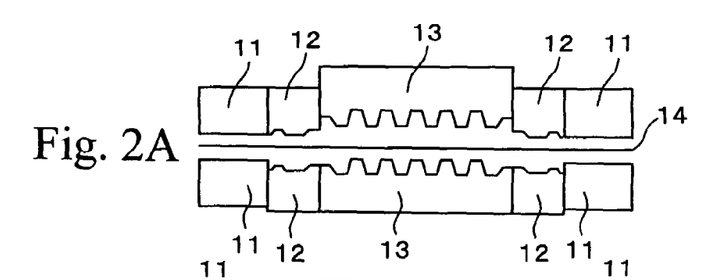
FIGS. 2A to 2D are side views showing in time series a press forming apparatus for metal separators for fuel cells and a separator material of the present invention.
Figure 2B:
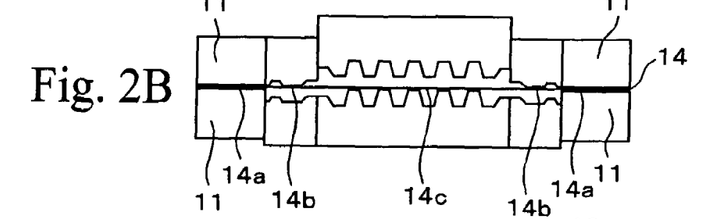
Figure 2C:
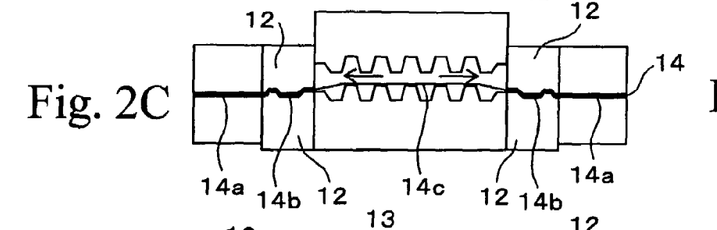
Figure 2D:
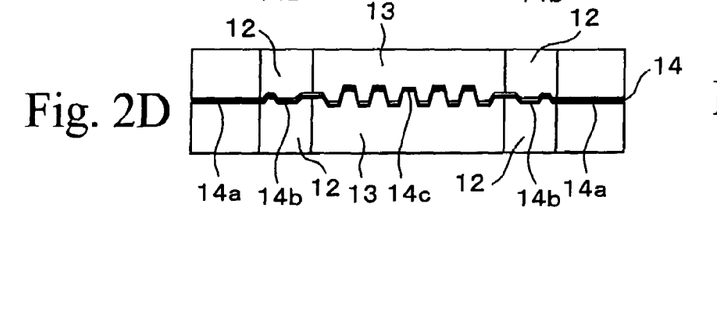
Figure 2E:
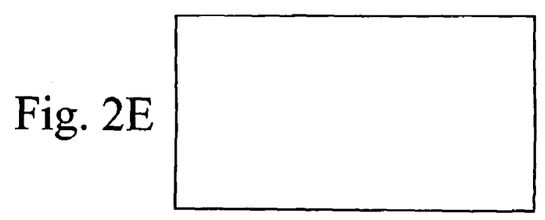
FIGS. 2E to 2H are plane views showing conditions of the separator materials corresponding to FIGS. 2A to 2D.
Figure 2F:
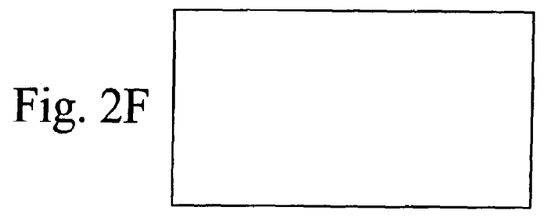
Figure 2G:
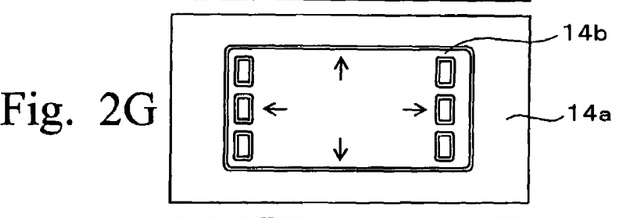

FIGS. 2A to 2D are side views showing in time series a press forming apparatus for metal separators for fuel cells and a separator material of the present invention, and FIGS. 2E to 2H are plane views showing conditions of the separator materials corresponding to FIGS. 2A to 2D. In FIGS. 2C and 2G, arrows denote a direction of stress generated in the separator material.

A press forming apparatus for metal separators for fuel cells shown in FIG. 2A has a pair of peripheral portion holding dies 11, a pair of intermediate portion forming dies 12 disposed inside the peripheral portion holding dies 11, and a pair of center portion forming dies 13 disposed inside the intermediate portion forming dies 12. The peripheral portion holding dies 11 hold a peripheral portion of a separator material and are movable toward and counter to each other. The intermediate portion forming dies 12 are for forming an intermediate portion of the separator material and are movable toward and counter to each other. The center portion forming dies 13 are for forming a center portion of the separator material and are movable toward and counter to each other. As shown in FIG. 2A, the upper peripheral portion holding die 11 and the upper intermediate portion forming die 12 are fixed to each other, and the upper center portion forming die 13 is slidably movable with respect to the upper intermediate portion forming die 12 toward the separator material. The lower intermediate portion forming die 12 and the lower center portion forming die 13 are fixed to each other, and the lower intermediate portion forming die 12 is slidably movable with respect to the lower peripheral portion holding die 11 toward the material.

In a case in which a separator material is subjected to press forming by using the apparatus of the present invention shown in FIGS. 2A to 2D, a separator material 14 is disposed as shown in FIG. 2A, a peripheral portion 14a of the separator material 14 is held by the peripheral portion holding dies 11 as shown in FIG. 2B, and the lower intermediate portion forming die 12 is moved upward after that as shown in FIG. 2C, so that a hole portion 14b which has a relatively few machined portions is formed. Next, as shown in FIG. 2D, the upper center portion forming die 13 is moved downward while the hole portion 14b is held by the intermediate portion forming dies 12, so that a buffer portion and passage groove portion 14c which has a relatively large number of machined portions is formed.

Figure 2H:
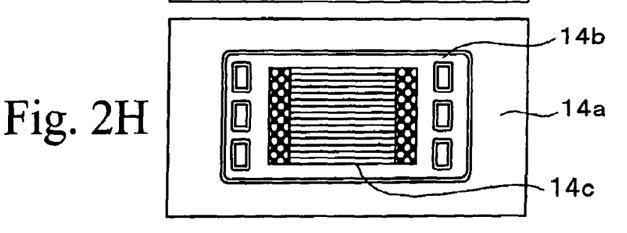

In the case in which the press forming apparatus for separators for fuel cells shown in FIGS. 2A to 2D, as shown in FIG. 2B, when the peripheral portion 14a of the separator material 14 is held by the peripheral portion holding dies 11, the buffer portion and passage groove portion 14c does not swell more downward with respect to the hole portion 14b disposed thereoutside. As a result, as shown in FIG. 2F, pulling does not occur in the separator material 14. Next, as shown in FIG. 2C, when the lower intermediate portion forming die 12 and the lower center portion forming die 13 are moved upward, the hole portion 14b having a relatively few machined portions is subjected to press forming before the buffer portion and passage groove portion 14c is worked, so that creases are not formed in the separator material as shown in FIG. 2G As shown in FIG. 2D, the upper center portion forming die 13 is moved downward while the hole portion 14 is held by the intermediate portion forming dies 12, so that the buffer portion and passage groove portion 14c is formed, whereby creases are not formed in the separator material as shown in FIG. 2H. As a result, in the case in which the apparatus shown in FIGS. 2A to 2D is used, creases, etc., are not formed, and good size accuracy can be obtained at several portions of the separator after a subsequent trimming process is performed. Therefore, it is easy to set the separator in a die in integrally forming a seal with the separator, and good sealing characteristics between separators can be obtained when separators are stacked in a stack.

Figure 3A:
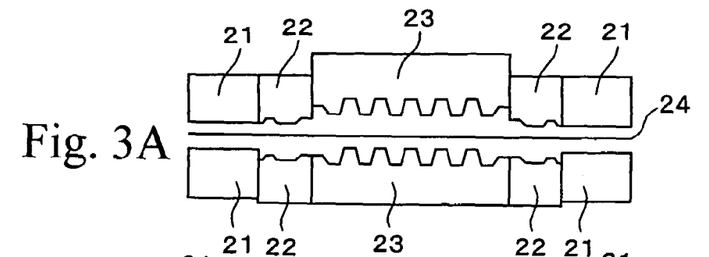
FIGS. 3A to 3D are side views showing in time series another press forming apparatus for metal separators for fuel cells and a separator material of the present invention.
Figures 3B, 3C:
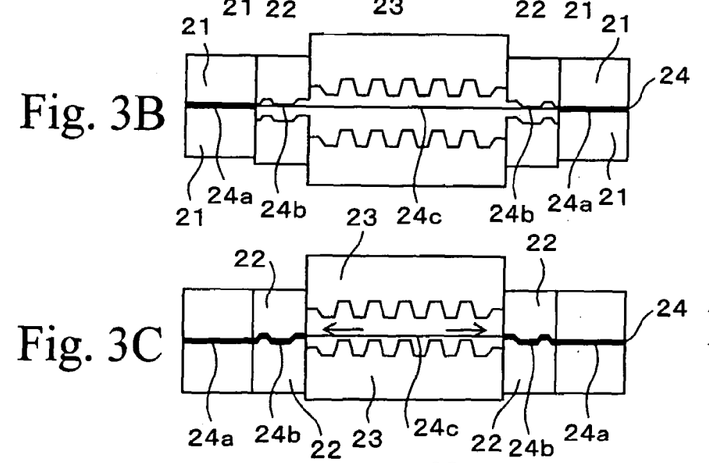
Figure 3D:
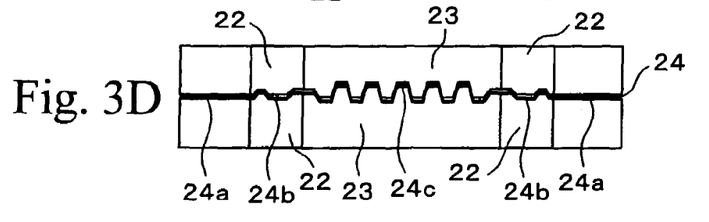
Figure 3E:
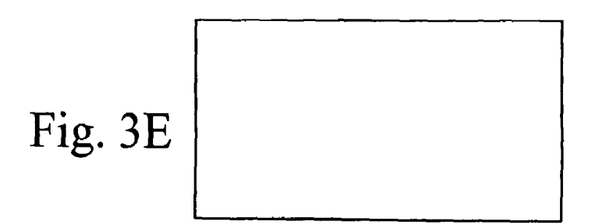
FIGS. 3E to 3H are plane views showing conditions of the separator materials corresponding to FIGS. 3A to 3D.
Figure 3F:
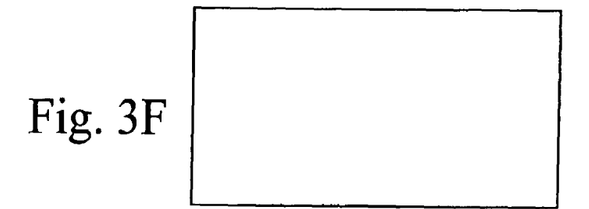
Figure 3G:
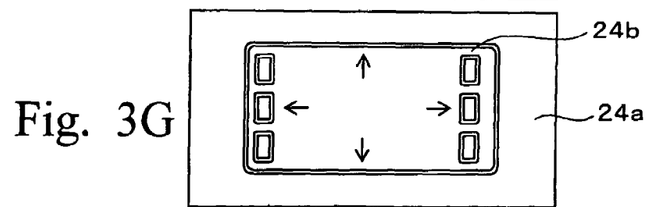

FIGS. 3A to 3D are side views showing in time series another press forming apparatus for metal separators for fuel cells and a separator material of the present invention, and FIGS. 3E to 3H are plane views showing conditions of the separator materials corresponding to FIGS. 3A to 3D. In FIGS. 3C and 3G, arrows denote a direction of stress generated in the separator material.

A press forming apparatus for metal separators for fuel cells shown in FIG. 3A has a pair of peripheral portion holding dies 21, a pair of intermediate portion forming dies 22 disposed inside the peripheral portion holding dies 21, and a pair of center portion forming dies 23 disposed inside the intermediate portion forming dies 22. The peripheral portion holding dies 21 hold a peripheral portion of a separator material and are movable toward and counter to each other. The intermediate portion forming dies 22 are for forming an intermediate portion of the separator material, and are movable toward and counter to each other. The center portion forming dies 23 are for forming a center portion of the separator material, and are movable toward and counter to each other. As shown in FIG. 3A, the upper peripheral portion holding die 21 and the upper intermediate portion forming die 22 are fixed to each other, and the upper center portion forming die 23 is slidably movable with respect to the upper intermediate portion forming die 22 toward the material. The lower intermediate portion forming die 22 is slidably movable with respect to the lower peripheral portion holding die 21 toward the material, and the lower center portion forming die 23 is slidably movable with respect to the lower intermediate portion forming die 22 toward the material.

In a case in which a separator material is subjected to press forming by using the apparatus of the present invention shown in FIGS. 3A to 3D, a separator material 24 is disposed as shown in FIG. 3A, a peripheral portion 24a of the separator material 24 is held by the peripheral portion holding dies 21 as shown in FIG. 3B, and the lower intermediate portion forming die 22 is moved upward after that as shown in FIG. 3C, so that a hole portion 24b which has a relatively few machined portions is formed. Next, as shown in FIG. 3D, the upper center portion forming die 23 is moved downward while the hole portion 24b is held by the intermediate portion forming dies 22, so that a buffer portion and passage groove portion 24c which has a relatively large number of machined portions is formed.

Figure 3H:
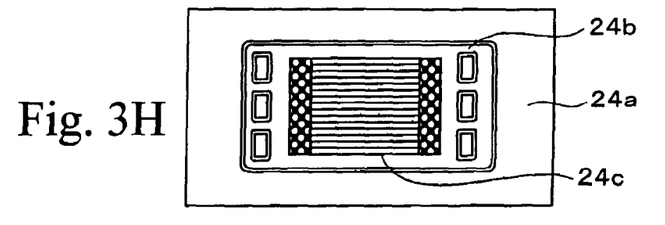

In the case in which the press forming apparatus for separators for fuel cells shown in FIGS. 3A to 3D, as shown in FIG. 3B, when the peripheral portion 24a of the separator material 24 is held by the peripheral portion holding dies 21, the buffer portion and passage groove portion 24c does not swell downward with respect to the hole portion 24b disposed thereoutside. As a result as shown in FIG. 3F, pulling is not generated in the separator material. Next, as shown in FIG. 3C, when the lower intermediate portion forming die 22 and the lower center portion forming die 23 are moved upward, the hole portion 24b having a relatively few machined portions is subjected to press forming before the buffer portion and passage groove portion 24c is worked, so that creases are not formed in the separator material as shown in FIG. 3G. As shown in FIG. 3D, the upper center portion forming die 23 is moved downward while the hole portion 24b is held by the intermediate portion forming dies 22, so that the buffer portion and passage groove portion 24c is formed, whereby creases are not formed in the separator material as shown in FIG. 3H. As a result, in the case in which the apparatus shown in. FIGS. 3A to 3D is used, creases, etc., are not formed, and good size accuracy can be obtained at several portions of the separator after a sequent trimming process is performed. Therefore, it is easy to set the separator in a die in integrally forming a seal with the separator, and good sealing characteristics between separators can be obtained when the separators are stacked in a stack.

In the apparatus shown in FIG. 2, the lower intermediate portion forming die 12 and the lower center portion forming die 13 are fixed to each other, and the lower dies 12 and 13 have a height difference in a upper surface due to worked volume difference thereof. Due to this, as shown in FIG. 2C, in a case in which the lower intermediate portion forming die 12 and the lower center portion forming die 13 are moved upward, the buffer portion and passage groove portion 14c of the separator material 14 swells a little upward. In contrast, in the apparatus shown in FIGS. 3A to 3D, the lower center portion forming die 23 is slidable with respect to the lower intermediate portion forming die 22. Due to this, as shown in FIG. 3C, the buffer portion and passage groove 24c of the separator material does not swell upward, so that formation of creases can be further prevented in press forming.

Figure 4A:
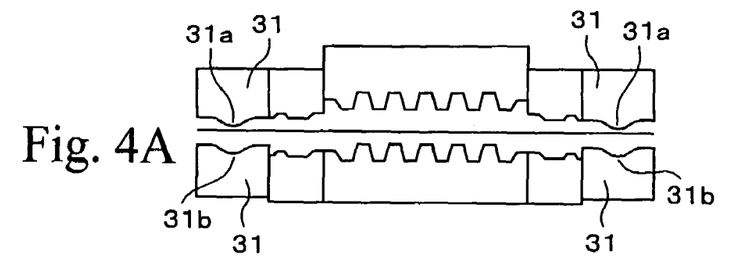
FIGS. 4A to 4D are side views showing in time series another press forming apparatus for metal separators for fuel cells and a separator material of the present invention.
Figure 4B:
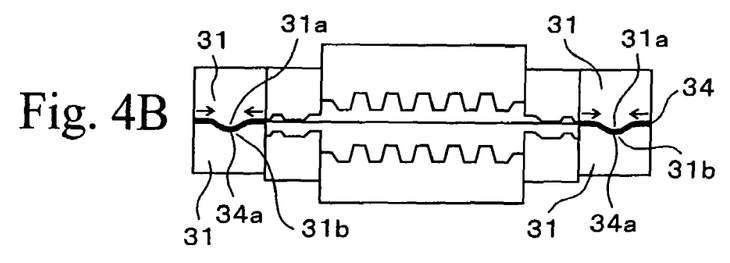
Figure 4C:
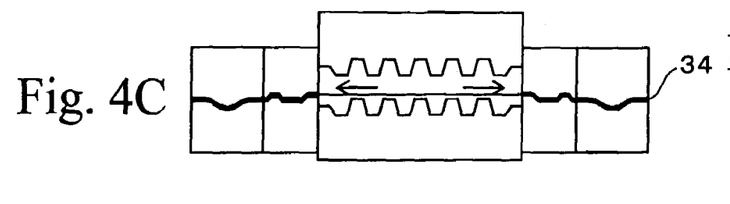
Figure 4D:
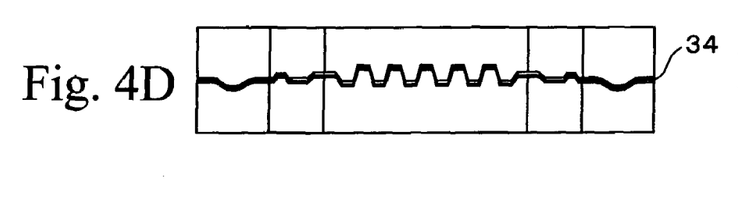
Figure 4E:
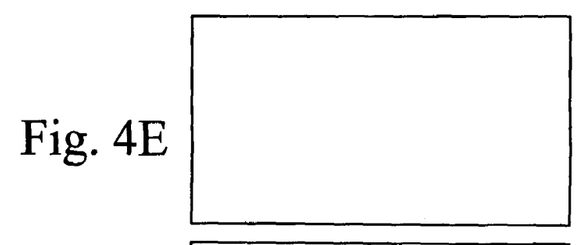
FIGS. 4E to 4H are plane views showing conditions of the separator materials corresponding to FIGS. 4A to 4D.
Figure 4F:
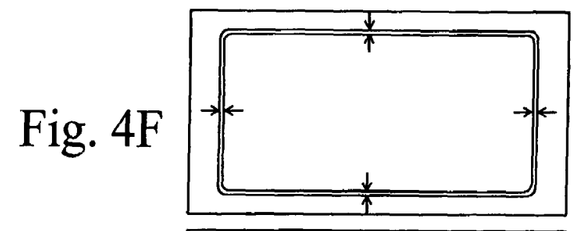
Figure 4G:
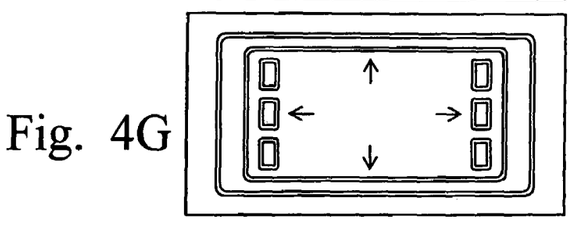

FIGS. 4A to 4D are side views showing in time series a press forming apparatus for metal separators for fuel cells and a separator material of the present invention, and FIGS. 4E to 4H are plane views showing conditions of the separator materials corresponding to FIGS. 4A to 4D. In FIGS. 4C and 4G, arrows denote a direction of stress generated in a separator material.

The press forming apparatus for metal separators for fuel cells shown in FIG. 4A has the same structure as the apparatus shown in FIG. 3A other than that a protrusion 31a is provided on the upper peripheral portion holding die 31 and a recess 31b is provided on the lower peripheral portion holding die 31. Explanations of portions shown in FIG. 4A which are the same as in FIG. 3A are omitted. In a case of the apparatus of the present invention shown in FIG. 3A is used, the above actions and effects in the case of the apparatus shown in FIG. 3A can be obtained, and the following actions and effects can be further obtained.

Figure 4H:
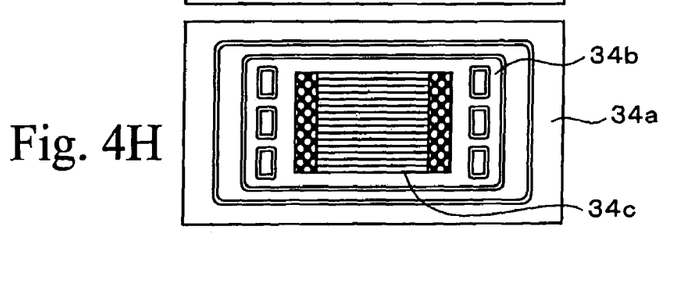

That is, in the case in which the apparatus shown in FIG. 4A is used, as shown in FIG. 4B, when a peripheral portion 34a of a separator material 34 is held by peripheral portion folding dies 31, the upper peripheral portion folding die 31 and the lower peripheral portion folding die 31 are fitted to each other, so that a portion of the separator material 34 disposed therebetween is deformed downward with respect to the other portion of the separator material 34 in FIG. 4B. The deformed portion has a loop body as shown in FIG. 4F. When the loop body is formed in the above manner, a portion surrounded by the loop body in the separator material is under extreme tension and thereby does not swell. Therefore, in forming the other portion after that as shown in FIGS. 4C and 4D, the above loop body functions as a stopper to prevent pulling of the separator material 34, so that the pulling of the separator material 34 is prevented on a still higher level, and a hole portion 34b and a passage groove portion and buffer portion 34c can be formed inside the peripheral portion 34a as shown in FIG. 4H.

Figure 5:
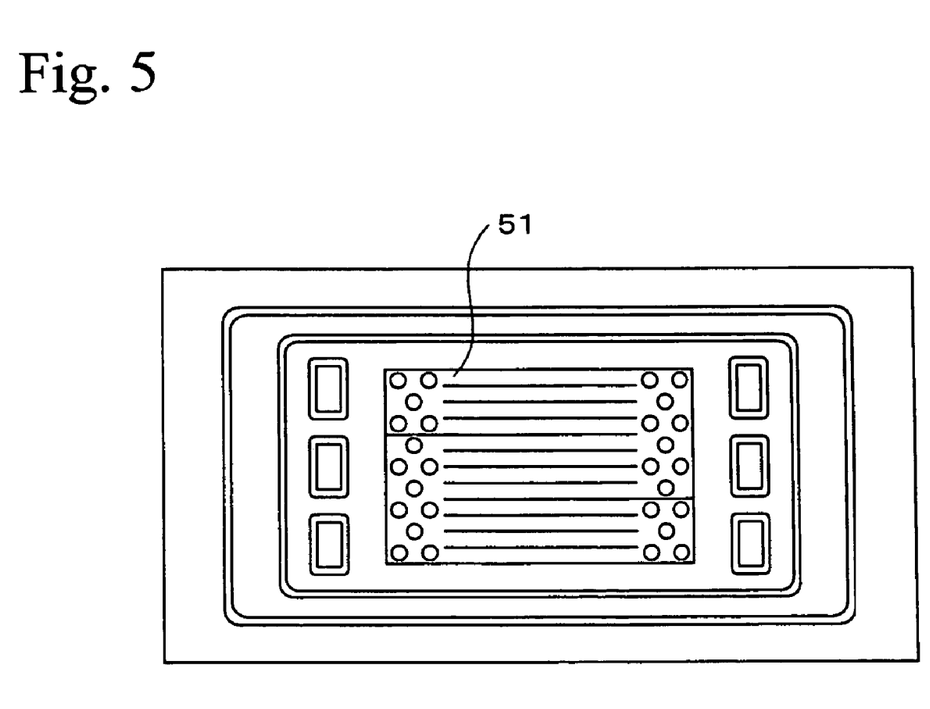
FIG. 5 is a plane view showing a state of a separator after press forming.

Press forming in the above embodiment by using the press forming apparatuses for metal separators for fuel cells of the present invention shown in FIGS. 2A to 4H corresponds to a press forming method of the present invention. In FIGS. 2A to 4H, passage groove portions (transverse line at a center in numeral references 14c, 24c, and 34c shown in FIGS. 2H, 3H, and 4H) disposed at a center portion in the buffer portions and passage groove portions 14c, 24c, and 34c favorably have a serpentine shape having at least one folded portion on a plane. FIG. 5 is a plane view showing the state of a separator after press forming, and an enlarged diagram of FIGS. 2H, 3H, and 4H. As shown in FIG. 5, oxygen, hydrogen, and water can be circulated from the one side (for example, left side) to the other side (for example, right side) of the separator material.

INDUSTRIAL APPLICABILITY

As explained above, according to the press forming apparatus and the press forming method for metal separators for fuel cells, it is easy to set a separator in a die when integrally forming a seal with the separator, and good sealing characteristics between separators can be obtained when stacking separators in a stack. Therefore, the present invention can be applied to forming techniques for metal separators for fuel cells, in which press forming precision is required.

What is claimed is:

1. A press forming apparatus for metal separators for fuel cells, comprising:
   a pair of peripheral portion holding dies which hold a peripheral portion of a material and are movable toward and counter to each other;
   a pair of intermediate portion forming dies for forming an intermediate portion of the material, which are disposed inside the peripheral portion holding dies and are movable toward and counter to each other; and
   a pair of center portion forming dies for forming a center portion of the material, which are disposed inside the intermediate portion forming dies and are movable toward and counter to each other,
   wherein one of the peripheral portion holding dies and one of the intermediate portion forming dies are fixed to each other, one of the center portion forming dies is movable with respect to one of the intermediate portion forming dies toward the material, the other intermediate portion forming die and the other center portion forming die are fixed to each other, and the other intermediate portion forming die is movable with respect to the other peripheral portion holding die.

2. A press forming apparatus for metal separators for fuel cells, comprising:
- a pair of peripheral portion holding dies which hold a peripheral portion of a material and are movable toward and counter to each other;
- a pair of intermediate portion forming dies for forming an intermediate portion of the material, which are disposed inside the peripheral portion holding dies and are movable toward and counter to each other; and
- a pair of center portion forming dies for forming a center portion of the material, which are disposed inside the intermediate portion forming dies and are movable toward and counter to each other, wherein one of the peripheral portion holding dies and one of the intermediate portion forming dies are fixed to each other, one of the center portion forming dies is movable with respect to one of the intermediate portion forming dies toward the material, the other intermediate portion forming die is movable with respect to the other peripheral portion holding die toward the material, and the other center portion forming die is movable with respect to the other intermediate portion forming die.

3. The press forming apparatus for metal separators for fuel cells, according to claim 2, wherein one of the peripheral portion holding dies has a protrusion and the other peripheral portion holding die has a recess, the protrusion and the recess are formed on opposite surfaces of the peripheral portion holding dies, and are fit to each other when the peripheral portion holding dies are moved toward each other.

* * * * *